United States Patent [19]

Kristinus et al.

[11] Patent Number: 5,571,546

[45] Date of Patent: Nov. 5, 1996

[54] FOOD PRODUCT AND METHOD OF MAKING SAME

[75] Inventors: Con L. Kristinus; Rainer W. Kristinus, both of Villanova, Pa.; Marvin J. Rudolph, Sharon, Mass.

[73] Assignee: Ciracor Limited, Villanova, Pa.

[21] Appl. No.: 271,227

[22] Filed: Jul. 6, 1994

Related U.S. Application Data

[63] Continuation of Ser. No. 99,988, Jul. 30, 1993, abandoned, which is a continuation of Ser. No. 759,299, Sep. 13, 1991, abandoned.

[51] Int. Cl.$^6$ ............................ A23G 3/00; A23L 1/0522
[52] U.S. Cl. ..................... 426/93; 426/103; 426/289; 426/460; 426/461; 426/549; 426/661
[58] Field of Search ........................... 426/93, 103, 289, 426/460, 461, 549, 661

[56] References Cited

U.S. PATENT DOCUMENTS

| | | | |
|---|---|---|---|
| 2,909,435 | 10/1959 | Watters et al. | 99/168 |
| 3,088,829 | 5/1963 | Rapaport | 99/139 |
| 3,446,707 | 5/1969 | Hollenbeck et al. | 195/70 |
| 3,527,646 | 9/1970 | Scheick et al. | 426/289 |
| 3,532,647 | 10/1970 | Ritson et al. | 260/6 |
| 3,582,350 | 6/1971 | Werbin et al. | 99/94 |
| 3,620,762 | 11/1971 | Yoshida et al. | 99/83 |
| 3,671,266 | 6/1972 | Cooper et al. | 99/126 |
| 3,676,158 | 7/1972 | Fischer et al. | 99/166 |
| 3,751,268 | 8/1973 | Van Patten et al. | 99/100 |
| 3,767,826 | 10/1973 | Fruin | 426/293 |
| 3,787,588 | 1/1974 | Turitz | 426/302 |
| 3,830,941 | 8/1974 | Luft et al. | 426/177 |
| 4,053,650 | 10/1977 | Chino et al. | 426/304 |
| 4,161,545 | 7/1979 | Green et al. | 426/93 |
| 4,163,065 | 7/1979 | Cilek | 426/94 |
| 4,247,561 | 1/1981 | Nelson | 426/53 |
| 4,293,572 | 10/1981 | Silva et al. | 426/19 |
| 4,487,786 | 12/1984 | Junge | 426/302 |
| 4,499,113 | 2/1985 | Mochizuki et al. | 426/103 |
| 4,508,736 | 4/1985 | Bean et al. | 426/19 |
| 4,515,820 | 5/1985 | Tang | 426/309 |
| 4,522,833 | 6/1985 | Sharma | 426/93 |
| 4,556,572 | 12/1985 | Kaufman, Jr. et al. | 426/289 |
| 4,596,714 | 6/1986 | Brabbs | 426/297 |
| 4,647,463 | 3/1987 | Hoover | 426/291 |
| 4,661,366 | 4/1987 | Pinto et al. | 426/572 |
| 4,663,175 | 5/1987 | Werner et al. | 426/289 |
| 4,692,342 | 9/1987 | Gannis et al. | 426/293 |
| 4,753,790 | 6/1988 | Silva et al. | 424/440 |
| 4,769,248 | 9/1988 | Wilkins et al. | 426/291 |
| 4,828,855 | 5/1989 | Sasaki et al. | 426/241 |
| 4,877,628 | 10/1989 | Stypula | 426/302 |
| 4,877,629 | 10/1989 | Stypula et al. | 426/302 |
| 4,910,028 | 3/1990 | Bernacchi et al. | 426/93 |
| 4,910,031 | 3/1990 | Budd et al. | 426/96 |
| 4,913,919 | 4/1990 | Cornwell et al. | 426/94 |

OTHER PUBLICATIONS

Bean, M., *Cereal Foods World*, vol. 31, No. 7, pp. 477–480 (Jul. 1986).
Bean et al., *Cereal Chemistry*, vol. 61, No. 6, pp. 475–479 (1984).
Nishita et al., *Cereal Chemistry*, vol. 59, No. 1, pp. 46–49 (1982).
Yuppi Food Product.

*Primary Examiner*—Helen Pratt
*Attorney, Agent, or Firm*—Synnestvedt & Lechner

[57] ABSTRACT

Edible coating compositions containing a mixture of linear and branched polysaccharides, are provided, by a mixture of waxy and non-waxy starches. The coating composition contains waxy starch having an amylose content of no greater than about two percent by weight and non-waxy starch having an amylose content of greater than about five percent by weight. The weight ratio of said waxy starch to said non-waxy starch in the coating composition is preferably greater than about 8:1. The food products have a comestible core substantially surrounded by the coating compositions. Methods for forming food products are also disclosed.

12 Claims, 1 Drawing Sheet

FOOD PRODUCT AND METHOD OF MAKING SAME

CROSS-REFERENCE TO RELATED APPLICATIONS

This is a continuation of U.S. application Ser. No. 08/099,988, filed Jul. 30, 199, now abandoned, which in turn is a continuation of U.S. application Ser. No. 07/759,299, filed Sep. 13, 1991, now abandoned.

The present invention relates to food products and methods of making food products. More particularly, the invention relates to food products prepared by coating a comestible core with a polysaccharide-based coating composition.

Leguminous seeds have been the basis for a sizable segment of the snack industry in the United States. Peanuts, for example, have long been a favorite snack food and are widely available in the natural state and in a variety of processed configurations, including salted, oil roasted and dry roasted. For the past several years, however, the growth of the peanut segment of the snack industry has stagnated due to the absence of a new and interesting peanut-based snack food. See, *Progressive Grocer*, July, 1989, pp. 110 et. seq.

Snack foods comprising peanuts surrounded by a flavored layer or coating are known. One disadvantage of many such prior products is that some or all of the coating materials, including the flavor portion thereof, are only lightly adhered to the outer surface of the snack product. This is undesirable because it tends to cause at least a portion of the coating material to become dislodged during handling of the product. As a result, a portion of such prior coating materials is not only lost from the product during shipping, but the coating material which remains intact tends to dirty the consumer's fingers during consumption. Salted peanuts, for example, possess this undesirable characteristic.

A relatively recent development in the snack food industry is the emergence of a large number of health conscious consumers. This development has, in turn, placed increased emphasis on the ingredients and processing techniques used to create snack foods. Many prior products, however, are unsatisfactory in this regard because they are formulated with components deemed to be undesirable from a health perspective. For example, much of the flavor of honey roasted nuts is provided by a high level of salt. In addition, many nut-based snack products are cooked or fried in saturated fats, thus potentially producing high levels of undesirable serum cholesterol. Another potential health concern has been the use of preservatives to enhance the shelf life of certain products. It is therefore desirable to provide a snack product which provides satisfying taste, nutrition, texture and appearance while also providing a long shelf life with little or no preservatives.

Various types and varieties of coated food products are known. For example, U.S. Pat. No. 4,053,650—Chino et al. discloses baked confections prepared by coating edible particles alternately with edible flour and aqueous solutions. According to this patent, the edible flour compositions are said to comprise "self-expandable cereal flours" and "non-expandable cereal flours or starches." The patent mentions α-waxy rice flour and α-waxy maize starch as examples of expandable cereal flours. According to the disclosed process, the aqueous solutions comprise corn syrup, sugar solution, dextrose solution and mixtures of these. The coated food product is then placed in a baking mold of predetermined size and shape, and the coating layer is said to puff upon baking so that the cavity of the mold is filled with the expanding materials.

Other coated food products are described in U.S. Pat. No. 4,499,113—Mochizuki et al. This patent is also related to food products having an expanded coating. The patent describes a product which is coated with a starchy flour formulation comprising 50 to 77½ weight percent of low expandability starchy flour, such as mashed potato flour and corn flour, and a smaller amount of highly expandable pregelatinized starchy flour. This formulation is then coated over a core material without a leavening agent. The coated food product is then fried to expand the coating. The mixing ratio of the less expandable starchy flour to the pregelatinized expandable starchy flour is said to be 60:40 to 30:70 by weight.

SUMMARY OF THE INVENTION

Applicants have discovered edible coating compositions which, when processed according to the methods of the present invention, provide a pleasantly crunchy and tasteful protective layer or shell surrounding a food particle core. The coating compositions comprise a mixture of linear and branched polysaccharides, as may be provided, for example, by a mixture of waxy and non-waxy starches. More particularly, it is preferred that the coating composition comprise waxy starch having an amylose content of no greater than about two percent by weight and non-waxy starch having an amylose content of greater than about five percent by weight. One important aspect of the present invention relates to applicant's discovery that the weight ratio of said waxy starch to said non-waxy starch in the coating composition should preferably be greater than about 8:1.

The present invention also provides food products comprising a comestible core substantially surrounded by the coating compositions of the present invention.

Methods for forming food products are also provided. The methods generally comprise providing a comestible core and coating said core with at least a first layer comprising the coating compositions described above. Applicants have found that a pleasantly crunchy layer is formed on the comestible core by subsequently gelatinizing the waxy starch in said coating composition by, for example, exposing the coated core to steam.

DESCRIPTION OF PREFERRED EMBODIMENTS

I. The Coating Compositions

Figure 1:
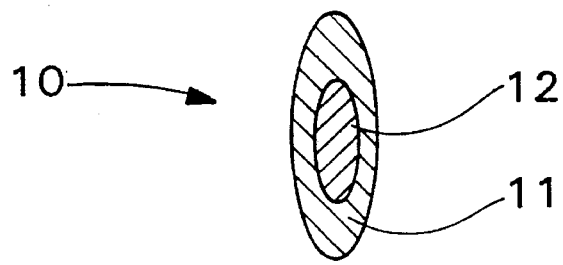
FIG. 1 is a schematic, cross-sectional view of a food product according to a first embodiment of the present invention.

The coating compositions of the present invention comprise, preferably in major proportion, polysaccharide compounds. According to an important aspect of the present coating compositions, the polysaccharide comprises amylose and amylopectin.

Amylose and amylopectin are polysaccharides which correspond to high molecular weight carbohydrates having the general formula $(C_6H_{10}O_5)_n$. Amylose, a linear homopolymer of α-D-glucopyranoside, is believed to consist of chains of numerous D-(+)-glucose units, with each unit joined by an alpha glycoside linkage to C-4 of the next unit, as illustrated in the structural formula below:

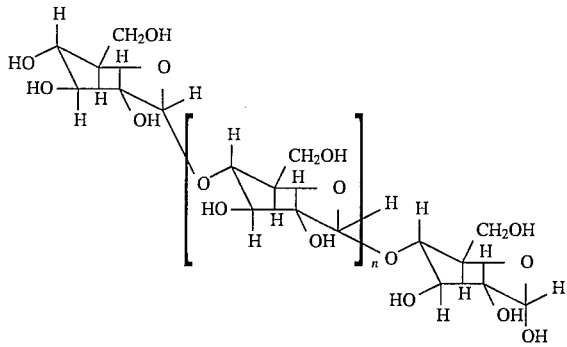

The number of glucose units per amylose molecule is not certain and is believed to vary widely, ranging from about 200 to about 4000, with 600 units being about average. The molecular weight of amylose typically ranges from about 150,000 to about 600,000. Furthermore, it is generally accepted that amylose molecules contain little or no branching of the chain.

Amylopectin, on the other hand, is a relatively highly branched homopolymer of α-D-glucopyranoside and also consists of chains of numerous D-(+)-glucose units, with each unit joined by an alpha glycoside linkage to C-4 of the next unit. However, amylopectin has a branched structure consisting of numerous chains of about 20 to about 25 glucose units each. One end of each of these shorter chains is joined to through C-1 on a first chain to a C-6 on a second chain, as shown below:

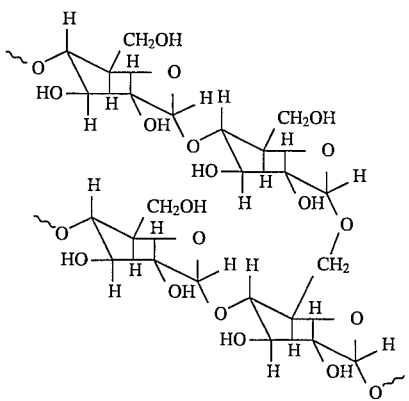

The amylopectin molecule is typically a very long chain poller, having molecular weights ranging from about 500,000 to about 1,000,000.

The beneficial and desirable characteristics of the present coating compositions are believed to derive, at least in part, from the relative amounts of amylose and amylopectin in the composition. In particular, applicants have found that the present compositions, especially when in the form of a liquid suspension or slurry, possess the ability to readily adhere to the core portion of the present food product. Furthermore, the present compositions possess an ability to expand without splitting, cracking or rupturing during heat treatment to form a crisp, tasty protective layer having a cellular structure. Applicants have found that these and other important characteristics of the present compositions are provided by polysaccharide mixtures having an amylose:amylopectin weight ratio of from about 1:99 to about 1:10, with from about 1:60 to about 1:20 being even more preferred. The objects of the present invention are also generally satisfied when the present compositions include polysaccharide mixtures comprising from about 0.5 to about 10 percent by weight of amylose and from about 90 to about 99 percent by weight of amylopectin, with from about 0.5 to about 5 percent by weight of amylose being preferred according to certain embodiments. While the underlying basis for the exceptional performance exhibited by the present compositions is not fully understood, and without intending to be bound by or limited to any particular theory, it is believed that the specified amount of amylose enhances the processability of the composition without detracting from the desirable expandability provided by the specified amounts of amylopectin.

Numerous sources of polysaccharides are known, and it is contemplated that polysaccharides from all such sources are adaptable for use in the compositions and food products of the present invention. It is preferred, however, that the polysaccharide mixtures according to the present invention be derived from a plant source. It is well known that starch occurs naturally in plants as granules whose size, shape and polysaccharide content, among other features, are characteristic of the source from which it is obtained. Most common starches derived from plants contain both amylose and amylopectin, with the relative amounts of these polysaccharides varying widely. The present coating compositions can be formed, for example, by providing mixtures comprising waxy and non-waxy plant starches.

The term waxy starch is commonly used, and for the purpose of convenience is used herein, to designate starches having an amylose content of no greater than about 2 percent by weight, or an amylose:amylopectin ratio less than about 2:98. The term non-waxy starch is used herein to designate those starches having an amylose content of greater than about 5 percent by weight, or an amylose:amylopectin ratio of greater than about 5:95. While it is contemplated that waxy starches having an amylose content of up to about 2% by weight are adaptable for use in the present compositions, it is highly preferred that the waxy starches contain less than about 1% by weight amylose, and even more preferably less than about 0.5%. Furthermore, it is preferred that the non-waxy starches of the present invention contain greater than about 10% by weight amylose, and even more preferably no less than about 15% by weight.

An important aspect of the embodiments which utilize plant starch as a source of polysaccharide resides in the ratio of the waxy to non-waxy starch in the starch mixture. In particular, the present coating compositions preferably have a waxy starch:non-waxy starch weight ratio of greater than about 8:1, more preferably greater than about 10:1, and even more preferably from about 8:1 to about 12:1. The above-noted ratios are especially preferred when the waxy starch contains less than about 1% by weight amylose and when the non-waxy starch contains no less than about 15% amylose.

Coating compositions having waxy starch:non-waxy starch weight ratios as described above provide several desirable properties. For example, applicants have found that the present coating compositions, especially when applied according to the methods of the present invention, are readily coatable onto core materials such as nuts and the like. Furthermore, and perhaps more importantly, applicants have found that, when processed as described hereinafter, such a coating produces a pleasantly flaky layer which protects the core and adds its own savory taste to the food product.

Many sources of waxy starch are known and available to those skilled in the art, and all such waxy starches are believed to be within the scope of the present invention. For example, waxy varieties of corn, sorghum, barley and rice flour are acceptable sources of waxy starch, with glutinous rice flour being most preferred. Furthermore, it is highly preferred that the waxy starch comprise glutinous rice flour produced according to the wet milling processes common in some Asian countries. While the wet milling of glutinous rice produces changes in the properties of the resulting starch which are not fully understood, applicants have surprisingly found that such wet milling provides waxy starch that results in coating compositions with exceptional taste and texture properties, especially when processed as described hereinafter to produce coated food products.

In order to realize the advantages of the present invention most fully, it is also highly preferred that the waxy starch comprise non-pregelatinized starch, with it being even further preferred that the waxy starch comprise at least about 90% by weight non-pregelatinized waxy starch. As those skilled in the art are aware, modified and pregelatinized forms of all types of starch material are generally available. Applicants have found, however, that the use of such materials for the waxy starches of the present invention is generally not desirable. For example, pregelatinized waxy starch is believed not to possess the same beneficial processing characteristics as the non-pregelatinized form.

The non-waxy starch included in the compositions of the present invention is also available from a large number of acceptable sources. For example, high amylose content wheat flour and corn flour are believed to be acceptable, with wheat flour being preferred.

The amount of starch in the coating compositions is also an important aspect of the present invention. In particular, the present coating compositions preferably comprise, on a water-free basis, at least about 40% by weight of starch, and even more preferably from about 40% to about 90% by weight. As those skilled in the art are aware, starch in its natural form generally includes what is known as water of constitution. The water of constitution of most starches is from about 8% to about 11% by weight of the total weight of the starch. Unless otherwise specifically indicated herein, this water of constitution, as opposed to added water, is included in the weight of the starches for all specified amounts, percentages and ratios, even when said values are on a "water-free basis." Values which are provided on a water-free basis refer to values which have been calculated based on the absence of added water.

The present coating compositions also preferably include monosaccharides, disaccharides or mixtures of these in an amount sufficient to provide the desired flavor to the coating and the finished product. Fructose is a preferred monosaccharide and sucrose is a preferred disaccharide. For the purpose of convenience, the term simple sugar is used herein to refer to the group including monosaccharides, disaccharides and mixtures of these. Compositions containing from about 10 to about 50 percent of simple sugar on a water-free weight basis are generally acceptable, with amounts from about 20 to about 40 percent being preferred.

In order to enhance coatability, the present compositions preferably include minor amounts of added water. According to certain preferred embodiments, the compositions comprise from about 20 weight percent to about 40 weight percent added water.

The present compositions are adaptable for use in a variety of physical forms, and all such forms are believed to be within the scope of the present invention. It is generally known that polysaccharides are typically available in the form of fine powders or granules of starch, and it is contemplated that in certain preferred embodiments of the present invention the compositions may comprise some or all of said powders or granules being wet, dissolved, dispersed, suspended and/or gelled by the added water. For example, when intact starch granules are present, such granules are typically insoluble and may be suspended or merely wet by the added water. For embodiments in which the outer membrane of the starch granule is broken, by grinding for example, the granules may swell in cold water and form a gel.

II. The Food Product

A. The Comestible Core

Figure 2:
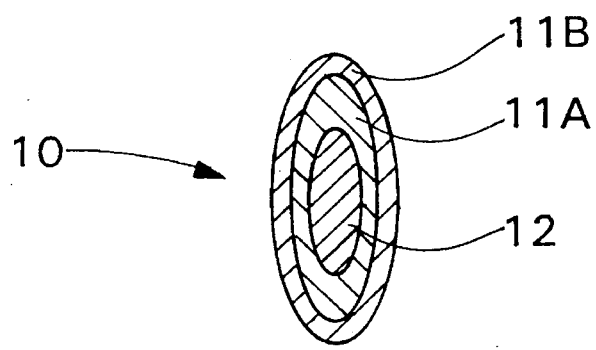
FIG. 2 is a schematic, cross-sectional view of a food product according to a second embodiment of the present invention.
Figure 3:
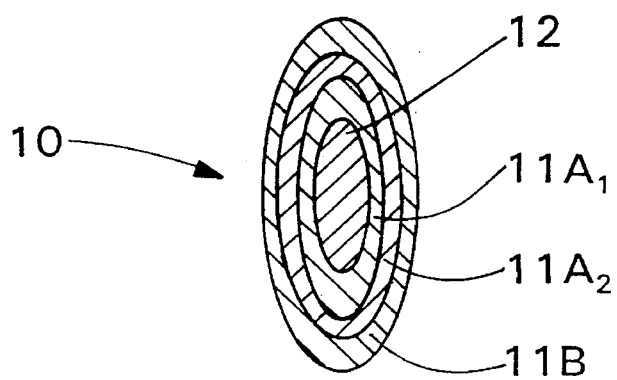
FIG. 3 is a schematic, cross-sectional view of a food product according to a third embodiment of the present invention.

As illustrated in schematic cross-section in FIGS. 1, 2 and 3, the present invention provides food products, designated generally as 10, having a shell or covering 11, and surrounding a comestible core 12. As explained more fully hereinafter, the beneficial properties of the shell are due, in large part, to the use of the present coating compositions. Given the description contained herein, it is contemplated that one skilled in the art will be capable of using the present methods and coating compositions on a large number of core types. It is generally preferred, however, that the core material of the present invention comprise edible seeds, nuts and dried fruits. Examples of such preferred core materials include peanuts, cashews, almonds, walnuts, filberts, macadamia nuts, pecans and raisins. It will be understood that the use of the term core herein is not limiting and may include, for example, an aggregate of two or more individual food pieces. It is contemplated, for example, that the core may include an aggregation of two or more peanuts, or an aggregation of a peanut and a raisin.

Due to the unique characteristics of the present coatings and methods, it is generally neither necessary nor desirable to significantly pre-treat the core prior to processing. In the case of peanuts, for example, it is not necessary that the testa be removed from the nut, nor is it necessary or preferred that roasting take place prior to coating. In fact, applicants have surprisingly found that when roasted coated nuts are being produced, the desirable roasted nut flavor is enhanced or "locked in" when roasting occurs after the nut has been coated according to the present methods. Accordingly, it is highly preferred that the comestible core of the present invention comprise shelled but otherwise unprocessed nuts, preferably peanuts.

B. The Covering

The shell or covering 11 which surrounds the comestible core 12 of the present food products 10 preferably comprises a relatively thin layer comprising the coating composition of the present invention. As initially applied to the core, the coating composition is preferably in the form a paste or wet powder. During processing, the coating is converted successively to a relatively soft gelatinized layer and then to a relatively hard, cellular layer of gelatinized starch. Applicants have found that the relative proportions of amylose and amylopectin required by the present invention are important to achieving a coating material capable of undergoing such changes during processing without sacrificing the desirable characteristics of the final covering layer 11.

The amount of covering material used to form the food product is also an important aspect of certain embodiments of the present invention. It is contemplated that the amount of coating composition may vary depending upon a variety of factors, including the size and shape of the core, the particular processing conditions to be used and the specific properties desired for the final product. It is generally preferred, however, that the amount be sufficient to produce a generally uniform covering around the core such that gelatinization of the starch in the coating composition can proceed in-situ without substantial deterioration of the cohesiveness of the layer. That is, substantial gaps and breaks will appear in the covering if the amount of coating composition used is insufficiently small. On the other hand, it is preferred that the amount of coating composition be not so large as to inhibit the ability of the waxy starch in the coating composition to properly expand and dry. It has been found that the above-noted requirements are generally satisfied for food products having a covering:core weight ratio on a water-free basis of from about 0.7:1 to about 1.2:1, more preferably from about 0.8:1 to about 1.2:1, and even more preferably of about 1:1. Under certain conditions, during processing, for example, the covering preferably contains substantial amounts of added water. In such forms, the present food products preferably have a covering:core ratio of from about 1:1 to about 2:1, more preferably from about 1:1 to about 1.5:1, and even more preferably of about 1.5:1.

According to certain preferred embodiments, as illustrated in FIG. 2, the covering 11 comprises a savory, flaky inner layer 11A surrounded by a pleasantly crunchy outer layer 11B. In such embodiments, the properties and characteristics of the inner and outer layers combine to produce an exceptionally appetizing product. Such embodiments and the properties and characteristics thereof are explained in detail below.

C. The Inner Layer

The inner layer 11A of the multi-layer coverings of the present food products preferably comprises the coating composition according to the description contained above. The amount of coating composition used to form the inner layer may vary depending upon the factors described above in connection with the covering layer in general. It has been found that the above-noted requirements are generally satisfied for food products having an inner layer:core weight ratio on a water-free basis of from about 0.4:1 to about 1:1, and even more preferably from about 0.5:1 to about 0.9:1. It is especially preferred that the first layer:core ratio be from about 0.8:1 to about 0.9:1 when the core material comprises peanuts.

As described in detail above, preferred forms of the present coating compositions comprise, on a water-free basis, from about 10 weight percent to about 50 weight percent of simple sugars. An important aspect of certain embodiments of the present invention resides in food products in which the first layer comprises first and second sub-layers 11A1 and 11A2, as illustrated in FIG. 3. The second sub-layer 11A2 preferably substantially surrounds the first sub-layer 11A1, while the first sub-layer is preferably immediately adjacent to the comestible core 12. According to an important aspect of this embodiment of the present invention, the concentration of simple sugar in the first sub-layer 11A is substantially less than the concentration of simple sugar in the second sub-layer 11A2. Applicants have found that the presence of large amounts of simple sugar in the present coating compositions may tend to reduce the ability of the coating to adhere to the core during processing. On the other hand, the presence of simple sugars contributes favorably to the sensory properties of the present products. Therefore, in order to overcome the difficulties associated with the use of simple sugars without loss of the beneficial aspects thereof, the concentration of simple sugar in the first sub-layer 11A1 of the present invention is preferably substantially less than the concentration of simple sugar in the second sub-layer 11A2. It is especially preferred that the weight ratio of simple sugar in the second sub-layer to simple sugar in the first sub-layer be no less than about 1:0.8, and even more preferably no less than about 1:0.7. Although it is contemplated that the relative amount of first sub-layer and second sub-layer material may vary widely, the weight ratio of first sub-layer to second sub-layer is preferably about 1:1.

D. The Outer Layer

In its final form, the inner layer 11A provides a pleasantly expanded or puffed flaky material. Although the first layer has excellent taste and texture properties, in certain embodiments it does not provide a hard, crunchy, protective outer shell, which may be desirable. Accordingly, the present food products preferably include an outer layer 11B comprising non-waxy starch in predominate proportion on a water-free basis. Thus, it is preferred that the outer layer comprises polysaccharide having an amylose content which is much greater than the amylose content of the polysaccharide in the first layer. More particularly, it is preferred that the weight ratio of the non-waxy starch in the outer layer to the non-waxy starch in the inner layer is from about 3.5:1 to about 5:1. In an especially preferred embodiment, the outer layer comprises, on a water-free basis, at least about 90% non-waxy starch. The use of non-waxy starch in the second layer of the present invention has several advantages. For example, non-waxy starch, especially non-waxy starch derived from wheat flour, forms a relatively strong and flexible gel. Thus, the outer coating is sufficiently strong and flexible to continue surrounding the inner layer as the inner layer expands during processing according to the present invention. Furthermore, heating of such non-waxy starch according to the present methods produces a relatively hard, crunchy outer shell surrounding the inner layer.

As with the inner layer, the amount of material used to produce the outer layer of the present invention will vary widely, depending upon a variety of factors. It is generally preferred, however, that the weight ratio on a water-free basis of the outer layer to the core be from about 0.15:1 to about 0.4:1, with 0.2:1 to about 0.25:1 being even more preferred.

E. Other Components

The covering, including the inner and outer layers 11A and 11B described above, may have incorporated therein or applied thereto many other components that do not detract from the aforementioned desirable properties. For example, it is contemplated that processing aids, such as corn syrup, may be included in the present coating compositions to affect the taste or texture of the covering. In many embodiments it will also be desirable to add flavoring ingredients to the covering. According to the preferred multi-layer embodiments, flavoring solution is preferably incorporated into the outer layer of the present food products according to methods described more fully hereinafter.

III. The Methods

The present methods are especially well adapted to produce food products comprising a comestible core and a covering layer comprising the coating composition of the present invention. While it is contemplated that certain known food processing techniques may be adapted to produce similar products, applicants have discovered that the particular steps of the present invention produce an exceptionally desirable product. In particular, applicants have found that the herein described methods are generally capable of consistently producing a food product having a covering which is at once savory, pleasantly textured, crisp, flaky and protective.

A. The Application Step

The methods of the present invention include the step of applying a layer of the present coating compositions to a comestible core. The particular techniques which are utilized in any particular case to carry out the applying step may vary widely depending upon factors such as the type and size of the comestible core, the particular features and characteristics of the coating composition being used, available equipment and cost of labor. It is contemplated, therefore, that all such heretofore used techniques for applying coating compositions are adaptable for use according to the present invention.

A highly preferred technique for applying a layer of the present compositions to the comestible core comprises coating the comestible core with the present coating compositions. The coating step may comprise, for example, sprinkling, spraying, or pouring the coating composition onto the comestible core. This step is beneficially carried out by providing a plurality of comestible cores and adding sufficient kinetic energy to the cores to obtain mixing of same. It is particularly preferred that the kinetic energy be provided to the cores so as to achieve substantial relative movement between the individual cores while maintaining the group of cores in a substantially fixed location. This can be achieved, for example, by placing the cores in a low friction revolving pan of known design.

During mixing of the cores, the coating composition is preferably sprinkled, poured or sprayed onto the moving cores. The rates of mixing, spraying, sprinkling and pouring may vary widely depending upon many factors, such as the equipment used and the desired size and shape of the food product. In general, however, it is desired that the coating composition be applied to the cores so as to maximize the uniformity of the thickness of the layers applied. While it is contemplated that many methods are known and available for achieving layers of substantially uniform thickness, the coating step preferably utilizes a two-part coating comprising a substantially liquid portion and a substantially solid portion applied in an alternating fashion. According to such embodiments, the substantially solid portion of the coating composition preferably comprises relatively fine starch powder which is substantially free of added water, and the substantially liquid portion of coating composition comprises an aqueous solution, suspension, dispersion or light paste containing simple sugar, preferably a major proportion by weight of simple sugar and preferably a minor proportion by weight of a non-waxy starch. The composition is then applied to the comestible cores by alternately sprinkling, spraying or pouring the solid and liquid compositions onto the moving comestible cores to produce a layer of the present coating composition on the core. For example, the solid and liquid portions are divided into an equal number of fractions, and the coating step comprises alternating applications of solid and liquid compositions until the total amount of coating is applied. Applicants have found that such a coating technique provides highly beneficial results. For example, this technique provides for a relatively uniform build-up of coating composition on the comestible core. Furthermore, this technique also provides a coating which is relatively strongly adhered to the comestible core.

After the coating is applied, the present methods require gelatinizing at least a substantial portion of the waxy starch, and preferably the waxy and non-waxy starch, contained in the coating composition. As understood by those skilled in the art and as used herein, gelatinization refers to the heating of starch granules to about the gelatinization temperature range of those granules. While known to be generally insoluble in cold water, starch granules are also known to swell rapidly when heated in the presence of water. Furthermore, it is known that relatively dilute solutions, dispersions or suspensions of starch in aqueous systems exhibit a characteristic birefringence under polarized light. As the starch granules swell upon heating in water, they tend to lose their characteristic cross under polarized light and imbibe water rapidly until they are many times their original size. As the term is used herein, gelatinization temperature refers to the birefringence end point temperature (BEPT) of the starch. As the term is used herein, BEPT refers to the temperature of the starch at 90–95% birefringence extinction during heating of a starch/water slurry under a polarizing microscope. For many waxy rice starches, this temperature is from about 110° F. to about 150° F. Thus, gelatinization of the waxy starch contained in the present coating compositions can generally be achieved by heating the coated comestible core to at least about the BEPT of the starch.

While any of the well known and accepted means for heating starch to the BEPT are believed to be adaptable according to the present invention, applicants have discovered that exceptional results are obtained when the gelatinization step comprises exposing the coated food product to steam at slightly elevated pressures for a time sufficient to obtain substantial gelatinization of the waxy starch. Although the principles which result in the observed beneficial result are not fully understood, applicants have nevertheless found that obtaining gelatinization in this fashion enhances the desirable characteristics of the resulting food product. Furthermore, applicants have found that superior results are obtained with steam pressures ranging from about 1.0 atmospheres to about 1.5 atmospheres, with about 1.35 being preferred. It is also preferred that the coated comestible core be exposed to steam for a period of time ranging from about 1 to about 5 minutes, with 2 to about 2.5 minutes being even more preferred.

Subsequent or simultaneous with the gelatinization step described above, the waxy starch in the coating composition is expanded or puffed by exposing the food product to elevated ambient conditions in the roaster. In terms of the temperature of the food product itself, expansion preferably comprises raising the temperature of the food product to from about 290° F. to about 310° F. Various equipment and methods are available for raising the temperature of the food product to within the preferred ranges, and all such methods are within the scope of the present invention. Applicants have found, however, that the step of raising the temperature preferably comprises introducing the coated food product into a rotating roasting cage for a period of from about 45 to about 60 minutes, with said roasting cage being maintained at a temperature of from about 350° F. to about 500° F., and even more preferably from about 350° F. to about 460° F.

After the temperature of the coated food product is elevated, the coated food product is then cooled, preferably slowly cooled, to about room temperature. This step can be achieved, for example, by removing the coated product from the roasting drum and allowing it to equilibrate under ambient conditions.

Embodiment of the present invention are illustrated below in connection with the following examples. It will be appreciated that these examples are illustrative of the present invention but not limiting thereof.

IV. Examples

Example I—Preparation of Coating Materials

A first coating composition according to the present invention in the form of dry powder (coating composition A) was provided by mixing about 23 parts by weight (PBW) of a waxy starch consisting of non-pregelatinized glutinous rice flour, about 1 PBW of non-waxy starch consisting of non-pregelatinized regular rice flour, and about 1 PBW of non-waxy starch consisting of wheat flour to produce a dry, substantially homogeneous starch mixture. The glutinous rice flour was derived from an Asian source of rice believed to have been wet milled. The glutinous rice flour, the regular rice flour and the wheat flour are believed to have had the approximate polysaccharide concentrations listed in Table 1 under the headings GRF, RRF and WF, respectively.

TABLE 1

| Polysaccharide Content, Wt % | Polysaccharide Concentrations Flour Type | | |
|---|---|---|---|
| | GRF | RRF | WF |
| Amylose | 0–1 | 15–25 | 20–25 |
| Amylopectin | 99–100 | 75–85 | 75–80 |

A second coating composition according to the present invention in the form of a dry powder (coating composition B) was provided by mixing about 11.5 PBW of coating A and about 2 PBW of sucrose to produce a homogeneous blend of starch and sucrose.

A first aqueous solution, dispersion or suspension (hereinafter solution X) was provided by mixing with mild heating about 61 PBW of the regular rice flour in about 1633 PBW of demineralized and deionized water. The regular rice flour in solution X was then substantially completely gelatinized by bringing the composition to about 204° F. while mixing.

A second aqueous solution, dispersion or suspension (hereinafter solution Y) was provided by mixing while heating to a temperature of about 180°–190° F. about 157 PBW of granulated sugar, about 9 PBW of crystalline fructose, about 13 PBW soy sauce and about 13 PBW corn syrup in about 287 PBW of solution X.

A third aqueous solution, dispersion or suspension (hereinafter solution Z) was provided by mixing while heating to a temperature of about 212° F. about 80 PBW of wheat flour in about 2520 PBW of solution demineralized and deionized water.

The composition of each of the coatings and solutions described herein are provided on a weight percent basis in Table 2 below.

TABLE 2

| Ingredient, Wt % | Coating Compositions & Solutions | | | | |
|---|---|---|---|---|---|
| | A | B | X | Y | Z |
| Glutinous Rice Flour | 92 | 78.4 | | | |
| Regular Rice Flour | 4 | 3.4 | 3.6 | 2.3 | |
| Wheat Flour | 4 | 3.4 | | | 3.1 |
| Simple sugar | | 14.8 | | 34.7 | |
| Soy Sauce | | | | 2.7 | |
| Corn Syrup | | | | 2.7 | |
| H$_2$O | | | 96.4 | 57.6 | 96.9 |

Example II—Preparation of the Food Product

About 100 parts by weight of shelled but otherwise untreated peanuts were introduced into an open-ended rotating pan. About 30 PBW of coating A and about 24 PBW of solution X were poured in alternating small fractions thereof onto the inter-mixing nuts to produce a first sub-layer of coating composition on the nuts. A second inner sub-layer was then applied to the coated nuts by pouring alternating small fractions of about 30 PBW of coating B and about 24 PBW of solution Y onto the inter-mixing nuts. An outer layer was then applied to the twice-coated nuts by applying in alternating small fractions about 23 PBW wheat flour and about 11 PBW of solution Z to the twice-coated nuts in the revolving pan. The compositions of the first inner sub-layer, the second inner sub-layer and the outer layer are provided in Table 3 under column headings FISL, SISL and OL, respectively.

TABLE 3

| Ingredients, Wt % | Covering Compositions | | |
|---|---|---|---|
| | FISL | SISL | OL |
| Glutinous Rice Flour | 51.1 | 34.8 | |
| Regular Rice Flour | 3.8 | 2.7 | |
| Wheat Flour | 2.2 | 1.5 | 68.5 |
| Simple sugar | 0 | 25.8 | |
| Soy Sauce | 0 | 1.5 | |
| Corn Syrup | 0 | 1.5 | |
| H$_2$O | 42.9 | 32.2 | 31.5 |
| | 100.0 | 100.0 | 100.0 |

The coated nuts were then removed from the revolving pan and sprayed without 0.7 PBW of partially hydrogenated vegetable oil in order to inhibit the tendency of the coated food products to adhere to one another. The coated nuts were then placed in a steaming chest for about two minutes. The steaming chest was maintained in a constant steam atmosphere at a pressure slightly above atmospheric. The coated nuts were then removed from the steam bath and introduced into a revolving roasting cage maintained at about 350°–460° F. The coated product was roasted for about 45–55 minutes at a product temperature of about 300° F. The roasted food product was then removed from the roasting cage and coated with a flavoring sauce while hot.

A coated peanut having a multi-layer thereon was thus produced. The food products had a relatively uniform and pleasing appearance. The outer covering was pleasantly crisp while the inner covering was savory and flaky. Furthermore, the peanut contained within the covering layers was found to possess an appetizing taste of freshly roasted peanut. These desirable characteristics of the food product were found to remain substantially undiminished, without the presence of preservatives after storage at ambient conditions for a period of about 30 days.

Example III—Preparation of Coating Materials

A first coating composition according to the present invention in the form of dry powder (coating composition AA) was provided by mixing about 13400 parts by weight (PBW) of a waxy starch consisting of non-pregelatinized glutinous rice flour, about 520 PBW of non-waxy starch consisting of non-pregelatinized regular rice flour, about 580 PBW of non-waxy starch consisting of wheat flour and about 1280 PBW of granulated sugar to produce a dry, substantially homogeneous starch and sucrose mixture. The glutinous rice flour was derived from an Asian source of rice believed to have been wet milled. The glutinous rice flour, the regular rice flour and the wheat flour are believed to have had the approximate polysaccharide concentrations listed in Table 1 under the headings GRF, RRF and WF, respectively.

A first aqueous solution, dispersion or suspension (hereinafter solution XX) was provided by mixing with mild heating about 562 PBW of the regular rice flour and about 72 PBW of the non-pregelatinized glutinous rice flour described above in about 15400 PBW of demineralized and deionized water. The rice flour in solution XX was then substantially completely gelatinized by bringing the composition to about 204° F. while mixing.

A second aqueous solution, dispersion or suspension (hereinafter solution YY) was provided by mixing while heating to a temperature of about 180°–190° F. about 3577 PBW of granulated sugar, about 504 PBW of crystalline fructose, about 231 PBW soy sauce and about 353 PBW corn syrup in about 7464 PBW of solution XX.

A third aqueous solution, dispersion or suspension (hereinafter solution ZZ) was provided by mixing while heating to a temperature of about 212° F. about 138 PBW of wheat flour in about 4240 PBW of demineralized and deionized water.

The composition of each of the coatings and solutions described herein are provided on a weight percent basis in Table 4 below.

TABLE 4

| Ingredient, Wt % | Coating Compositions & Solutions | | | |
|---|---|---|---|---|
| | AA | XX | YY | ZZ |
| Glutinous Rice Flour | 84.9 | 0.5 | 0.3 | |
| Regular Rice Flour | 3.3 | 3.5 | 2.2 | |
| Wheat Flour | 3.7 | | | 3.1 |
| Simple sugar | 8.1 | | 33.6 | |
| Soy Sauce | | | 1.9 | |
| Corn Syrup | | | 2.9 | |
| H$_2$O | | 96.0 | 59.1 | 96.9 |

Example IV—Preparation of the Food Product

About 22600 parts by weight of shelled but otherwise untreated peanuts were introduced into an open-ended rotating pan. About 15780 PBW of coating composition AA and about 9700 PBW of solution YY were poured in alternating small fractions thereof onto the inter-mixing nuts to produce an inner layer of coating composition on the nuts. An outer layer was then applied to the once-coated nuts by applying in alternating small fractions about 4540 PBW wheat flour and about 1775 PBW of solution ZZ to the twice-coated nuts in the revolving pan. The compositions of the inner layer, the outer layer and the final product are provided in Table 5 under column headings IL, OL and FP, respectively.

TABLE 5

| Ingredients, Wt % | Covering Compositions | | |
|---|---|---|---|
| | IL | OL | FP |
| Glutinous Rice Flour | 52.7 | | 24.7 |
| Regular Rice Flour | 2.9 | | 1.3 |
| Wheat Flour | 2.3 | 72.8 | 9.5 |
| S imple sugar | 17.9 | | 8.4 |
| Soy Sauce | 0.7 | | 0.3 |
| Corn Syrup | 1.1 | | 0.5 |

TABLE 5-continued

| Ingredients, Wt % | Covering Compositions | | |
|---|---|---|---|
| | IL | OL | FP |
| H$_2$O | 22.5 | 27.2 | 13.7 |
| Nuts | | | 41.6 |
| | 100.0 | 100.0 | 100.0 |

The coated nuts were then removed from the revolving pan and sprayed with about 320 PBW of partially hydrogenated vegetable oil in order to inhibit the tendency of the coated food products to adhere to one another. The coated nuts were then placed in a steaming chest for about two minutes. The steaming chest was maintained in a constant steam atmosphere at a pressure slightly above atmospheric. The coated nuts were then removed from the steam bath and introduced into a revolving roasting cage maintained at about 350°–460° F. The coated product was roasted for about 45–55 minutes at a product temperature of about 300° F. The roasted food product was then removed from the roasting cage and coated with a flavoring sauce while hot.

A coated peanut having a multi-layer thereon was thus produced. The food products had a relatively uniform and pleasing appearance. The outer covering was pleasantly crisp while the inner covering was savory and flaky. Furthermore, the peanut contained within the covering layers was found to possess an appetizing taste of freshly roasted peanut. These desirable characteristics of the food product were found to remain substantially undiminished, without the presence of preservatives after storage at ambient conditions for a period of about 30 days.

Those skilled in the art will appreciate that the above description and drawings are illustrative of the present invention and not limiting thereof, and that the true spirit and scope of the present invention is defined only by the claims which follows.

What is claimed is:

1. A food product comprising:
   (a) a comestible core;
   (b) a first layer substantially covering said core and comprising a mixture of non-pregelatinized waxy starches and non-waxy starches having:
      (i) a first sub-layer comprising amylose and amylopectin in major proportion and disaccharide in minor proportion, the weight ratio of amylose to amylopectin in said first sub-layer being from about 1:99 to about 1:10; and
      (ii) a second sub-layer substantially covering said first sub-layer and comprising amylose and amylopectin in major proportion and disaccharide in minor proportion, the weight ratio of amylose to amylopectin in said second sub-layer being from about 1:99 to about 1:10 and the weight ratio of simple sugar in said second sub-layer to simple sugar in said first sub-layer being no less than about 1:0.8;
   (c) a second layer substantially covering said first layer, said second layer comprising amylose and amylopectin, the weight ratio of amylose to amylopectin in the second layer being no less than about 1:19.

2. The food product of claim 1 wherein the amylose:amylopectin weight ratio in said first layer is from about 1:24 to about 1:19.

3. The food product of claim 2 wherein the amylose:amylopectin weight ratio in said second layer is no less than about 1:4.

4. The food product of claim 1 wherein the amount of amylose and the amount of amylopectin in said first layer together comprise from about 40 to about 80 percent by weight on a water-free basis of said first layer.

5. The food product of claim 4 wherein the amount of amylose and the amount of amylopectin in said first layer together comprise from about 40 to about 60 percent by weight on a water-free basis of said first layer.

6. The food product of claim 1 wherein the weight ratio of simple sugar in said second sub-layer to simple sugar in said first sub-layer is no less than about 1:0.7.

7. The food product of claim 1 wherein said starch comprises starch gelatinized in situ.

8. The food product of claim 7 wherein said mixture of waxy and non waxy starches comprises non-pregelatinized waxy starch and non-waxy starch, the weight ratio of said waxy starch to said non-waxy starch in said first layer being greater than about 8:1.

9. The food product of claim 8 wherein said non-pregelatinized starch comprises starch gelatinized in situ.

10. The food product of claim 1 wherein the weight ratio of waxy starch to non-waxy starch in said first layer is from about 8:1 to about 12:1.

11. A food product comprising a (a) comestible core;

(b) a first layer substantially covering said core, said first layer comprising non-pregelatinized waxy starch and non-waxy starch in a weight ratio of greater than about 8:1; and (c) a second layer substantially covering said first layer, said second layer comprising in major proportion non-waxy starch.

12. A food product comprising:

(a) a comestible core;

(b) an expanded or puffed first layer substantially covering said core, said first layer comprising in major proportion non-pregelatinized waxy starch; and (c) a protective outer shell which substantially covers said first layer and which comprises in major proportion non-waxy starch.

* * * * *